United States Patent
Murphy et al.

(10) Patent No.: US 9,785,796 B1
(45) Date of Patent: *Oct. 10, 2017

(54) APPARATUS AND METHOD FOR AUTOMATED PRIVACY PROTECTION IN DISTRIBUTED IMAGES

(71) Applicant: Snap Inc., Venice, CA (US)

(72) Inventors: Robert Murphy, Venice, CA (US); Evan Spiegel, Los Angeles, CA (US)

(73) Assignee: Snap Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,095

(22) Filed: Jul. 15, 2016

Related U.S. Application Data

(63) Continuation of application No. 14/723,400, filed on May 27, 2015, now Pat. No. 9,396,354.

(60) Provisional application No. 62/004,168, filed on May 28, 2014.

(51) Int. Cl.
| | |
|---|---|
| *G06F 21/62* | (2013.01) |
| *G06F 21/10* | (2013.01) |
| *G06Q 50/00* | (2012.01) |
| *G06K 9/00* | (2006.01) |
| *H04L 12/58* | (2006.01) |

(52) U.S. Cl.
CPC .......... *G06F 21/6245* (2013.01); *G06F 21/10* (2013.01); *G06K 9/00288* (2013.01); *G06Q 50/01* (2013.01); *H04L 51/10* (2013.01); *G06F 2221/0724* (2013.01)

(58) Field of Classification Search
CPC .. G06F 21/6245; G06F 21/10; G06K 9/00268
See application file for complete search history.

(56) References Cited

U.S. PATENT DOCUMENTS

| | | | |
|---|---|---|---|
| 7,004,394 B2 | 2/2006 | Kim | |
| 7,856,449 B1 | 12/2010 | Martino et al. | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |

(Continued)

FOREIGN PATENT DOCUMENTS

| | | |
|---|---|---|
| CA | 2887596 A1 | 6/2016 |
| WO | 2014/194262 A2 | 12/2014 |
| WO | 2016/007285 A1 | 1/2016 |

OTHER PUBLICATIONS

International Search Report and Written Opinion issued to international patent application No. PCT/US2015/037251, Sep. 29, 2015, 7 pgs.

(Continued)

*Primary Examiner* — Oleg Korsak
(74) *Attorney, Agent, or Firm* — Cooley LLP

(57) ABSTRACT

A method executed by a computer includes receiving an image from a client device. A facial recognition technique is executed against an individual face within the image to obtain a recognized face. Privacy rules are applied to the image, where the privacy rules are associated with privacy settings for a user associated with the recognized face. A privacy protected version of the image is distributed, where the privacy protected version of the image has an altered image feature.

14 Claims, 10 Drawing Sheets

(56) References Cited

U.S. PATENT DOCUMENTS

| | | |
|---|---|---|
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,428,453 B1 | 4/2013 | Spiegel et al. |
| 8,471,914 B2 | 6/2013 | Sakiyama et al. |
| 8,560,612 B2 | 10/2013 | Kilmer et al. |
| 8,687,021 B2 | 4/2014 | Bathiche et al. |
| 8,744,523 B2 | 6/2014 | Fan et al. |
| 8,745,132 B2 | 6/2014 | Obradovich |
| 8,775,407 B1 | 7/2014 | Huang |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 8,909,725 B1 | 12/2014 | Sehn |
| 8,914,752 B1 | 12/2014 | Spiegel |
| 9,026,943 B1 | 5/2015 | Spiegel |
| 9,037,577 B1 | 5/2015 | Saylor et al. |
| 9,083,770 B1 | 7/2015 | Dröse et al. |
| 9,094,137 B1 | 7/2015 | Sehn |
| 9,098,832 B1 | 8/2015 | Scardino |
| 9,113,301 B1 | 8/2015 | Spiegel et al. |
| 9,225,897 B1 | 12/2015 | Sehn |
| 9,237,202 B1 | 1/2016 | Sehn |
| 9,276,886 B1 | 3/2016 | Samaranayake |
| 9,396,354 B1 | 7/2016 | Murphy et al. |
| 9,407,712 B1 | 8/2016 | Sehn |
| 9,407,816 B1 | 8/2016 | Sehn |
| 2002/0047868 A1 | 4/2002 | Miyazawa |
| 2002/0078456 A1 | 6/2002 | Hudson et al. |
| 2002/0122659 A1 | 9/2002 | McGrath et al. |
| 2002/0144154 A1 | 10/2002 | Tomkow |
| 2003/0016247 A1 | 1/2003 | Lai et al. |
| 2003/0037124 A1 | 2/2003 | Yamaura et al. |
| 2003/0052925 A1 | 3/2003 | Daimon et al. |
| 2003/0126215 A1 | 7/2003 | Udell et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0064899 A1 | 3/2007 | Boss et al. |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0049704 A1 | 2/2008 | Witteman et al. |
| 2008/0055269 A1 | 3/2008 | Lemay et al. |
| 2008/0104503 A1 | 5/2008 | Beall et al. |
| 2008/0207176 A1 | 8/2008 | Brackbill et al. |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0191631 A1 | 7/2010 | Weidmann |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0141025 A1 | 6/2011 | Tsai |
| 2011/0145564 A1 | 6/2011 | Moshir et al. |
| 2011/0184980 A1 | 7/2011 | Jeong et al. |
| 2011/0197194 A1 | 8/2011 | D'Angelo et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0255736 A1 | 10/2011 | Thompson et al. |
| 2011/0273575 A1 | 11/2011 | Lee |
| 2011/0283188 A1 | 11/2011 | Farrenkopf et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0036443 A1 | 2/2012 | Ohmori et al. |
| 2012/0054797 A1 | 3/2012 | Skog et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0163664 A1 | 6/2012 | Zhu |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0210244 A1 | 8/2012 | deFrancisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0323933 A1 | 12/2012 | He et al. |
| 2013/0024757 A1 | 1/2013 | Doll et al. |
| 2013/0050260 A1 | 2/2013 | Reitan |
| 2013/0057587 A1 | 3/2013 | Leonard et al. |

(56) References Cited

U.S. PATENT DOCUMENTS

| | | |
|---|---|---|
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0304646 A1 | 11/2013 | de Geer |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0089314 A1 | 3/2014 | Iizuka et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0279061 A1 | 9/2014 | Elimeliah et al. |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0298210 A1 | 10/2014 | Park et al. |
| 2014/0317302 A1 | 10/2014 | Naik |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0046278 A1 | 2/2015 | Pei et al. |
| 2015/0071619 A1 | 3/2015 | Brough |
| 2015/0094106 A1 | 4/2015 | Grossman et al. |
| 2015/0116529 A1 | 4/2015 | Wu et al. |
| 2015/0172534 A1 | 6/2015 | Miyakawa et al. |
| 2015/0365795 A1 | 12/2015 | Allen et al. |
| 2016/0006927 A1 | 1/2016 | Sehn |

OTHER PUBLICATIONS

Fajman, "An Extensible Message Format for Message Disposition Notifications", Request for Comments: 2298, National Institutes of Health, Mar. 1998, 28 pgs.

Supplementary European Search Report issued to EP Application No. 14804343.3, Sep. 29, 2016, 11 pgs.

Ivisit, "iVisit Mobile Getting Started", Dec. 4, 2013, iVisit, pp. 1-16.

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self_destruct_in_60_seconds, referred to hereinafter as READ-WRITE.

Sawers, Paul, "Snapchat for iOS Lets You Send Photos to Friends and Set How long They're Visible for", May 7, 2012, <http://thenextweb.com/apps/2012/05/07/Snapchat-for-ios-lets-you-send-photos-to-friends-and-set-how-long-theyre-visiblefor/#!xCjrp>, pp. 1-5.

Shein, "Ephemeral Data", Communications of the ACM, vol. 56, No. 9, Sep. 2013, pp. 20-22.

Snapchat, "How Snaps Are Stored and Deleted", May 9, 2013, 3 pgs.

Voxer Business, "Android Getting Started Guide", Feb. 1, 2014, 18 pgs., downloaded from https://voxer.com/assets/AndroidGuide.pdf.

International Search Report and Written Opinion issued to International Patent Application No. PCT/US2014/040346, Mar. 23, 2015, 9 pgs.

APPARATUS AND METHOD FOR AUTOMATED PRIVACY PROTECTION IN DISTRIBUTED IMAGES

CROSS-REFERENCE TO RELATED INVENTION

This application is a continuation of U.S. patent application Ser. No. 14/723,400 filed May 27, 2015 which claims priority to U.S. Provisional Patent Application Ser. No. 62/004,168, filed May 28, 2014, the contents of which are incorporated herein by reference.

FIELD OF THE INVENTION

This invention relates generally to digital images (e.g., digital photographs and videos). More particularly, this invention relates to techniques for automated privacy protection in distributed images.

BACKGROUND OF THE INVENTION

The ubiquity of digital equipment, such as smartphones and wearable technology, has created privacy concerns. In particular, large numbers of individuals are in a position to take and distribute images of another individual without the consent of the photographed or videoed individual. Accordingly, it would be desirable to provide techniques for automated privacy protection in digital image distribution.

SUMMARY OF THE INVENTION

A method executed by a computer includes receiving an image from a client device. A facial recognition technique is executed against an individual face within the image to obtain a recognized face. Privacy rules are applied to the image, where the privacy rules are associated with privacy settings for a user associated with the recognized face. A privacy protected version of the image is distributed, where the privacy protected version of the image has an altered image feature.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
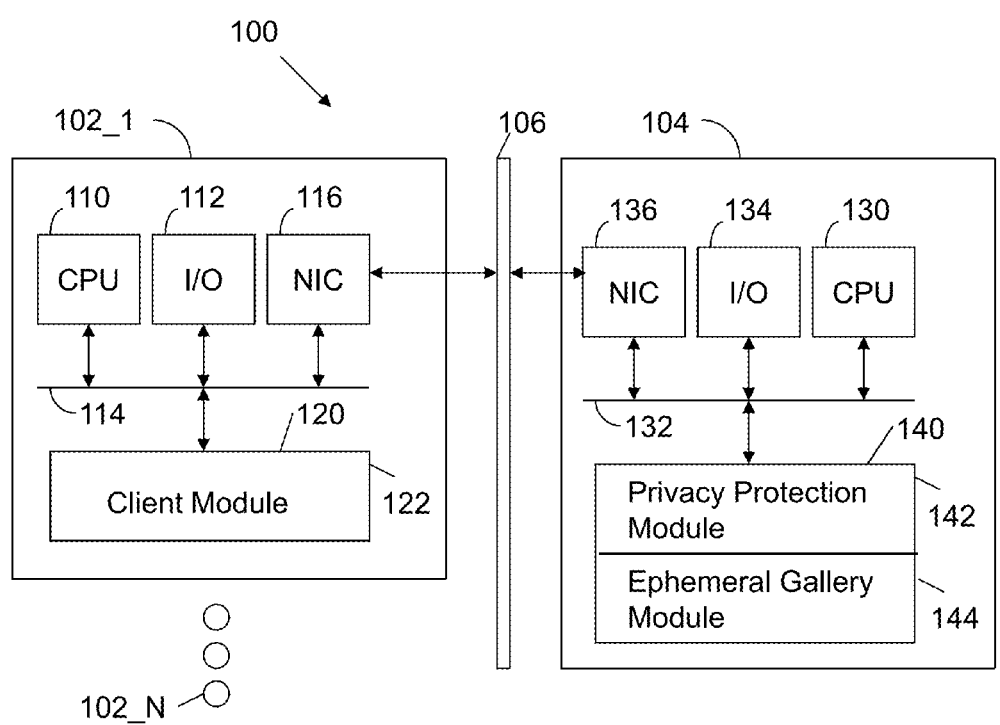
FIG. 1 illustrates a system configured in accordance with an embodiment of the invention.

FIG. 1 illustrates a system 100 configured in accordance with an embodiment of the invention. The system includes a set of client devices 102_1 through 102_N connected to a server 104 via a network 106, which may be any wired and/or wireless network. Each client device 102 includes standard components, such as a central processing unit 110 and input/output devices 112 connected via a bus 114. The input/output devices 112 may include a touch display, a keyboard, camera, individual input buttons and the like associated with a smartphone or wearable technology (e.g., eye glasses or a watch with processing power and a wireless network communication module). A network interface circuit 116 is also connected to the bus 114 to provide connectivity to network 106. A memory 120 is also connected to the bus 114. The memory 120 stores a client module 122 with executable instructions to implement image capture and distribution operations. In particular, the client module 122 coordinates image capture operations and communicates with server 104, which coordinates image distribution operations. The image may be a digital photograph or video.

The server 104 also includes standard components, such as a central processing unit 130, a bus 132, input/output devices 134 and a network interface circuit 136. A memory 140 is also connected to the bus 132. The memory 140 stores a privacy protection module 142, which includes executable instructions to implement operations of the invention, as discussed in connection with FIG. 2. The memory 140 also stores an ephemeral gallery module 144, which will be discussed below.

Figure 2:
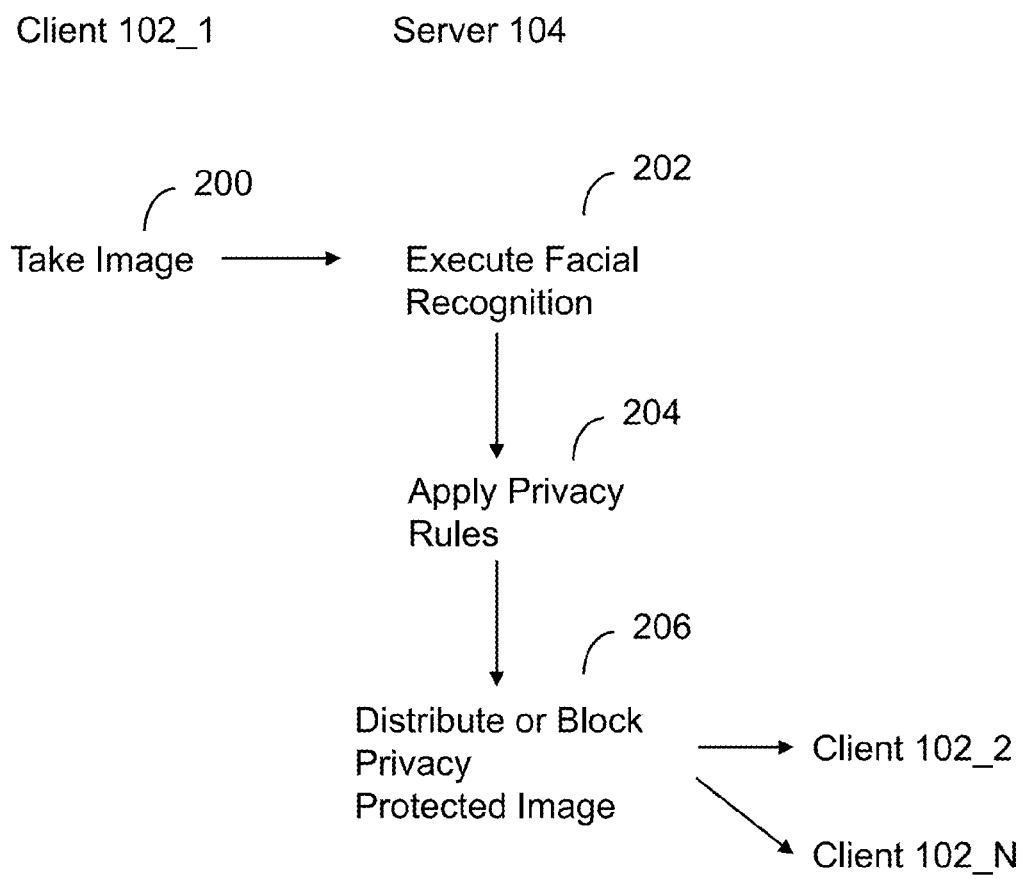
FIG. 2 illustrates processing operations associated with an embodiment of the invention.

As shown in FIG. 2, a client device 102_1 executing a client module 122 takes an image 200. The client module 122 coordinates the delivery of the image to the server 104. The server 104 receives the image. The server 104 may also receive an image from another service, such as a gallery of photographs or videos. The privacy protection module 142 executes facial recognition 202 for any faces present in the image. Automated facial recognition techniques in images are known in the art. In one embodiment, the privacy protection module 142 processes a set of images of a user and generates a facial signature that is associated with a user name. Facial signatures and associated user names may be maintained for all users within a photograph sharing or video sharing application. These operations may be performed on server 104. Alternately, the privacy protection module 142 coordinates calls to another networked server (not shown), which provides facial recognition services.

The next processing operation of FIG. 2 is to apply privacy rules 204. The privacy rules are associated with privacy settings for a user associated with a recognized face. For example, the privacy rules and/or privacy settings may specify that a facial image of user A may only be distributed from images taken by user A's device. Another rule may specify that images that include A's face may only be distributed from or to devices or accounts previously approved by A. For example, only usernames identified by user A may be allowed to distribute images that include user A (without the application of privacy rules). Similarly, images that include A's face may be distributed, without the privacy rules, to previously approved accounts or devices. Another rule may specify that a facial image of user B may only be distributed to friends in user B's social network. Another rule may specify that permission be obtained to distribute an image of a user that has privacy settings blocking such image distribution. For example, the privacy protection module 142 may automatically send a message on behalf of the user taking the image that seeks permission from the user that has privacy settings blocking such image distribution. The message may include the image and information on the user that took the image. Passwords or codes may be required for access to the image. That is, the viewer or message recipient may be required to obtain a password or code from the person in the image. In yet another embodiment, before being able to receive an image, the recipient may be prompted to send a request to the subject (i.e., the person in the picture) for permission to view the image. In response, a message is transmitted to the subject indicating that the recipient has requested access to view the image. The subject may then grant or deny access.

The final processing operation of FIG. 2 is to distribute or block privacy images 206 to various client devices, such as client 102_2 through 102_N. The privacy protected images have an altered image feature. The altered image feature may be a blurring of the facial image of a user that has requested privacy protection. Alternately, an emoticon, icon or brand may be placed over the face of the user that has requested privacy protection. The altered image may include a complete blocking of the face and body of the protected individual that has specified such privacy settings. Another embodiment restricts transmission or receipt of the privacy protected image (as opposed to transmitting or receiving a blurred image).

The privacy protected image may also be saved in a privacy protected format. In this case, the client 102_1 can only access a privacy protected image. Thus, if the user of client 102_1 has taken an image of an individual with privacy settings limiting which users can see such an image and such users do not include the user of client 102_1, then the user of client 102_1 only has access to a privacy protected format. This limits the user of client 102_1, but it allows individuals with privacy settings to control how other users capture them.

In an alternate embodiment, the facial recognition operation is used not for privacy purposes, but for enhancing the digital photograph in some specified manner. For example, the facial recognition operation may be used to add content, such as a sticker, text or an advertisement, which do not necessarily protect privacy or hide identity, but do provide an enhanced image.

In one embodiment, the image is ephemeral. That is, the image is configured for purposeful, and automatic, deletion after a certain period of time or after a certain action has been taken, such as viewing the image once. Thus, in these embodiments, privacy protected ephemeral images may be transmitted and distributed via any manner of communication, including, e.g., chat and other mobile application client, instant messenger, email, text/SMS, etc. The criteria for deleting the image are typically set by the individual taking the image. However, default criteria may be used (e.g., a single five second viewing period available for a twenty-four hour period).

Figure 3:
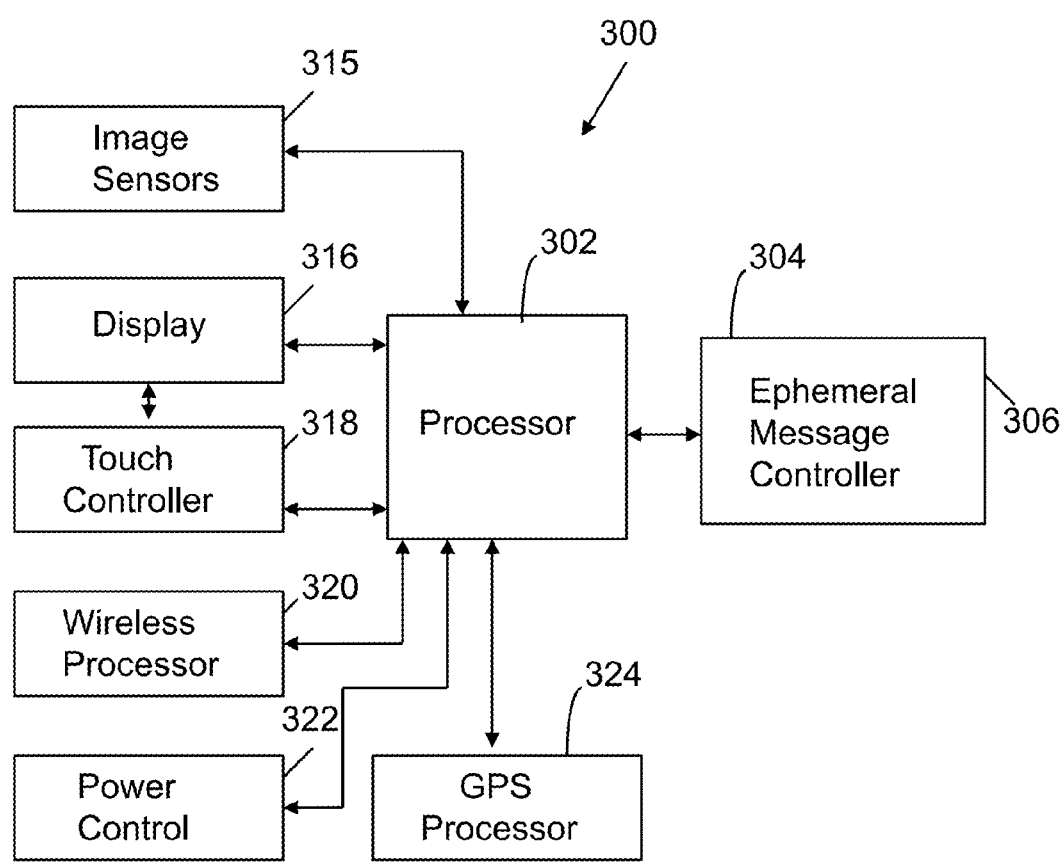
FIG. 3 illustrates components of an electronic device utilized in accordance with the invention.

The ephemeral images may be combined in an ephemeral gallery curated by the ephemeral gallery module 144. FIG. 3 illustrates an electronic device 300. In one embodiment, the electronic device 300 is a smartphone with a processor 302 in communication with a memory 304. The processor 302 may be a central processing unit and/or a graphics processing unit. The memory 304 is a combination of flash memory and random access memory. The memory 304 stores an ephemeral message controller 306 to implement operations of the invention. The ephemeral message controller 306 may include executable instructions to access a server which coordinates operations disclosed herein. Alternately, the ephemeral message controller 306 may include executable instructions to coordinate some of the operations disclosed herein, while the server implements other operations.

The display time for the ephemeral message is typically set by the message sender. However, the display time may be a default setting or a setting specified by the recipient. Regardless of the setting technique, the message is transitory (i.e., the message is deleted or otherwise made inaccessible after a certain period of time or after a certain action has been taken).

The processor 302 is also coupled to image sensors 315. The image sensors 315 may be known digital image sensors, such as charge coupled devices. The image sensors capture visual media, which is presented on display 316.

A touch controller 318 is connected to the display 316 and the processor 302. The touch controller 318 is responsive to haptic signals applied to the display 316. In one embodiment, the ephemeral message controller 306 monitors signals from the touch controller 318. If haptic contact is observed by the touch controller 318 in connection with indicia of an ephemeral gallery, then the ephemeral gallery is displayed to the user as a sequence of ephemeral messages.

The electronic device 300 may also include other components commonly associated with a smartphone, such as a wireless signal processor 320 to provide connectivity to a wireless network. A power control circuit 322 and a global positioning system processor 324 may also be utilized. While many of the components of FIG. 3 are known in the art, new functionality is achieved through the ephemeral message controller 306 operating in conjunction with a server (e.g., server 104).

Figure 4:
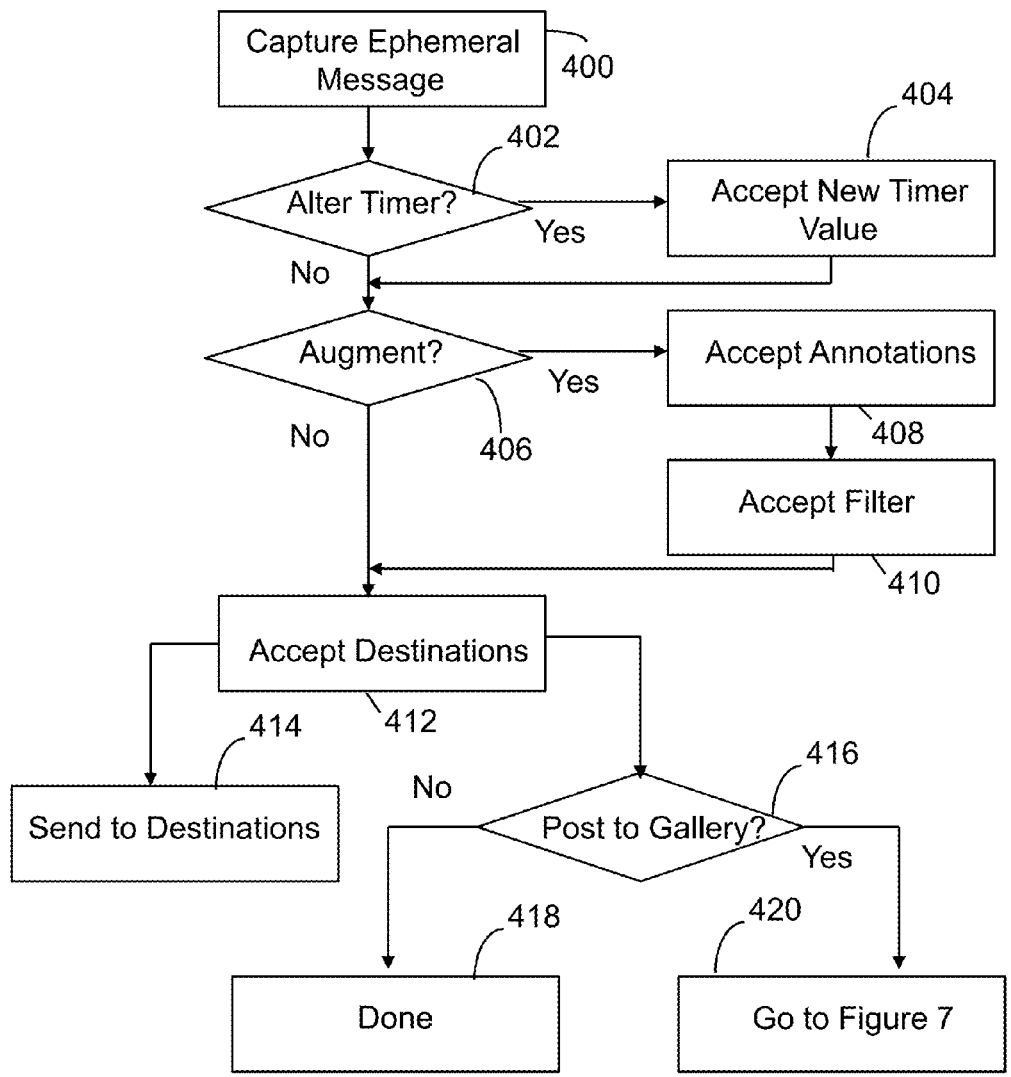
FIG. 4 illustrates processing operations associated with an embodiment of the invention.
Figure 5:
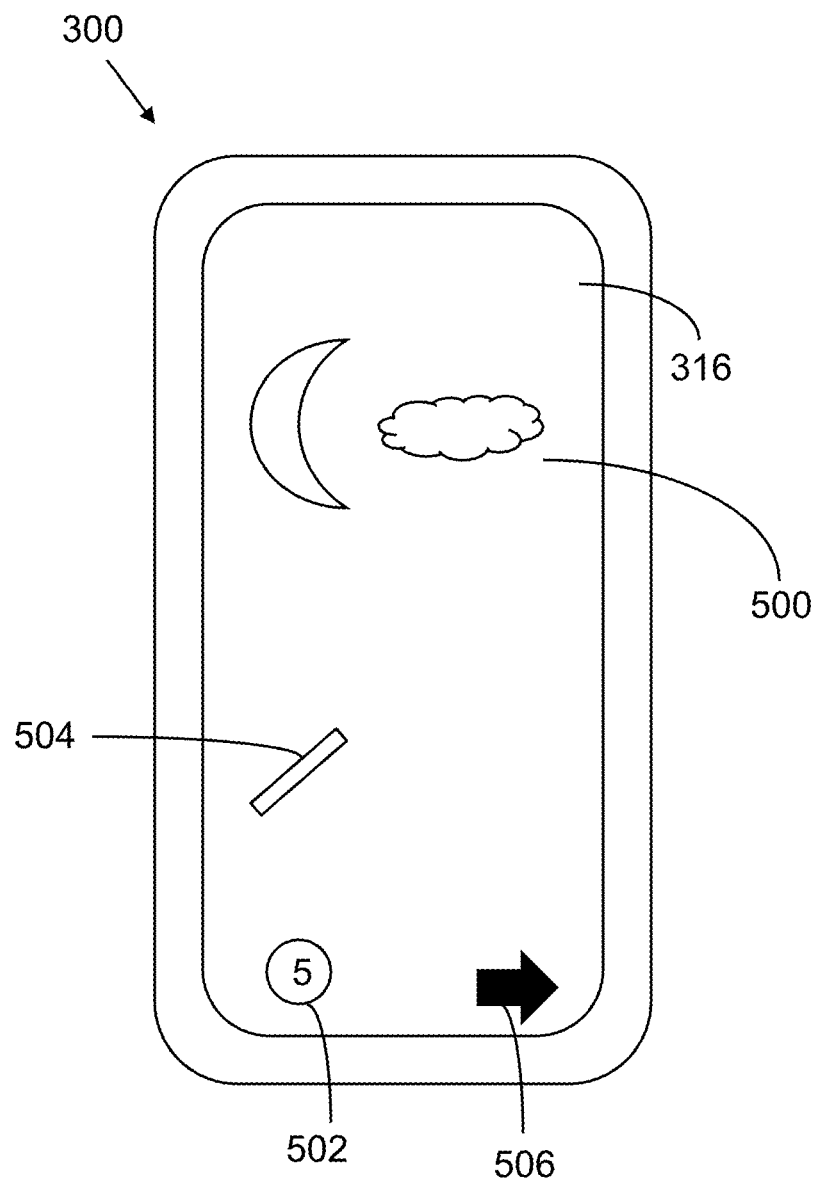
FIG. 5 illustrates an electronic device for capturing and augmenting an ephemeral message.

FIG. 4 illustrates processing operations associated with the ephemeral message controller 306. Initially, an ephemeral message is captured 400. FIG. 5 illustrates electronic device 300 and touch display 316 with a photograph 500 operative as an ephemeral message.

The next processing operation of FIG. 4 is to determine whether to alter a timer or a message duration parameter 402. FIG. 5 illustrates an example of indicia 502 of a message duration parameter. In this example, the indicion indicates a default of 5 seconds as the message duration parameter. If the indicia is engaged (e.g., through haptic contact), then a prompt may be supplied for a new message duration parameter (e.g., 10 seconds). Such activity (402—Yes) results in the acceptance of the new timer value 404. If a new timer value is specified or no alteration of a timer transpires (402—No) control proceeds to block 406. The user may be prompted to augment the ephemeral message. As shown in FIG. 5, a drawing tool 504 may be supplied to allow a user to add a hand drawn message. The drawing tool 504 may be manipulated by haptic contact to enter a message or annotation of visual media. Alternately or in addition, a keyboard may be used to type augment a message. For example, a tap on the touch display 316 may result in a keyboard being displayed, which allows a user to enter a typed message.

As shown in FIG. 4, annotations may be accepted 408 in this manner. Augmentation may also be in the form of photograph filters. That is, photograph filters may be accepted 410. For example, a first right-to-left swipe motion on the touch display 316 may drag a first filter on top of the photograph. A second right-to-left swipe motion on the touch display 316 may drag a second filter on top of the photograph. Filter processing of this type is described in commonly owned U.S. Ser. No. 14/325,270, filed Jul. 7, 2014, the contents of which are incorporated herein by reference.

Figure 6:
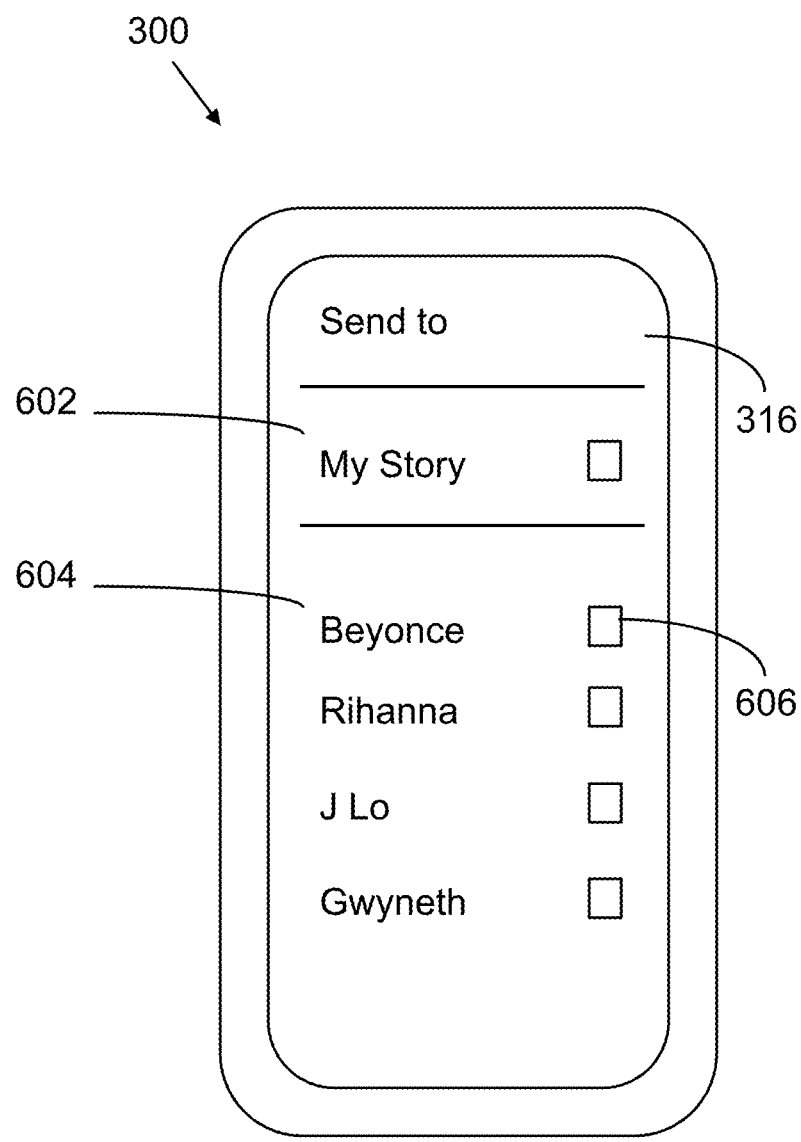
FIG. 6 illustrates an ephemeral message destination routing interface that may be used in accordance with an embodiment of the invention.

The next operation of FIG. 4 is to accept destinations 412. As more fully described below, a destination may be used to identify intended recipients of a message or a location or "gallery" where one or more messages may be accessed. FIG. 5 illustrates an icon 506 to invoke a destination list. Haptic contact on the icon may result in a destination list of the type shown in FIG. 6. FIG. 6 illustrates an electronic device 300 displaying a destination list. The destination list may include a destination of "My Story" 602, where "My Story" is a reference to an ephemeral gallery of ephemeral messages. The destination list may also include friends or contacts section 604 listing various friends that may be ephemeral message recipients. Haptic contact with a box 606 associated with a listed individual or story places the corresponding individual or story on a destination list.

Figure 7:
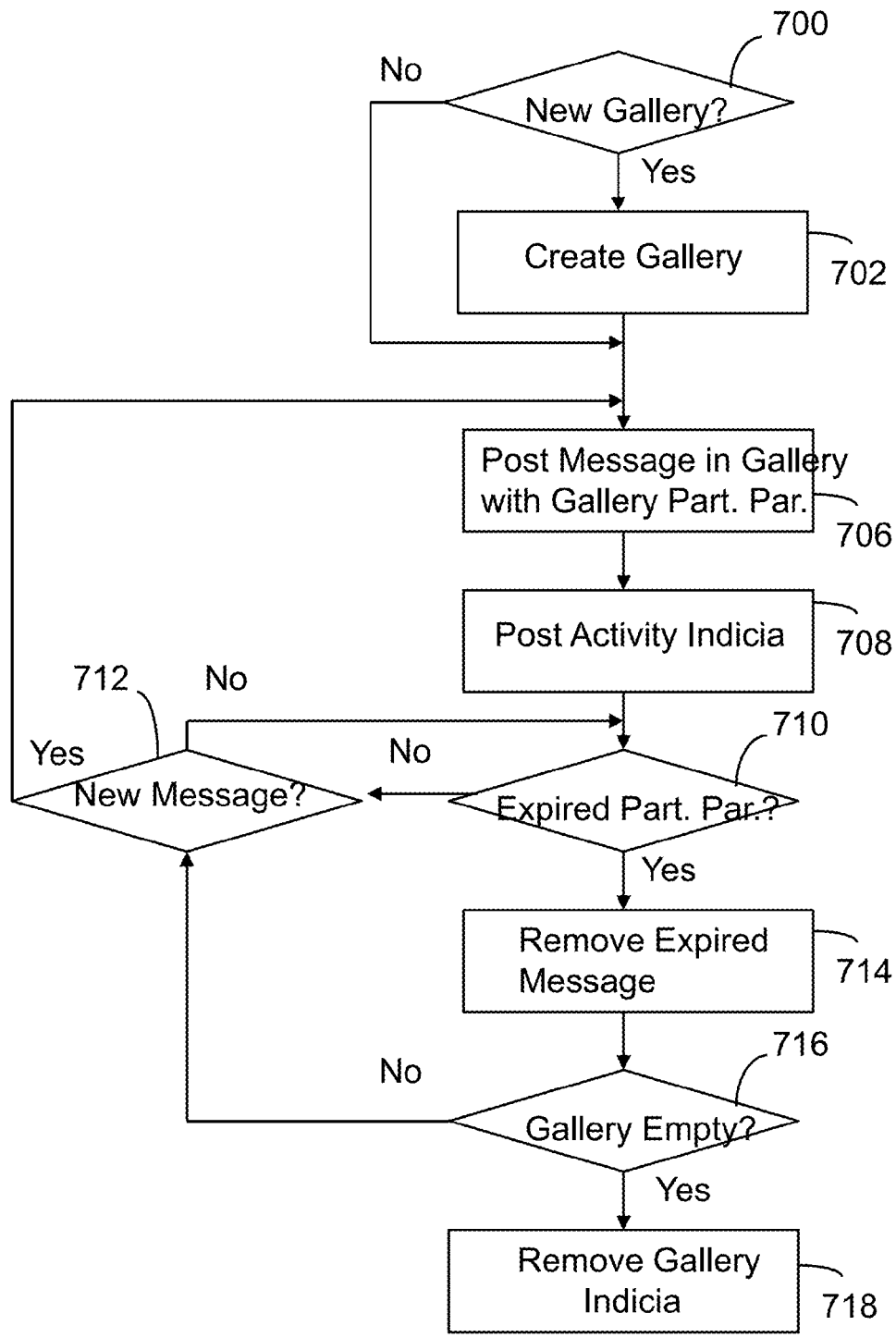
FIG. 7 illustrates ephemeral gallery processing operations associated with an embodiment of the invention.

Returning to FIG. 4, after the destination list is specified, the ephemeral message is sent to the specified destinations 414. For example, the ephemeral message is sent to friends selected from section 604, if any. A check is also made to determine whether the message should be posted to an ephemeral gallery 416. If not (416—No), processing is completed. If so (416—Yes), the processing of FIG. 7 is performed 420. Thus, it is possible to send a message to one or more friends and/or post to an ephemeral gallery.

The ephemeral gallery module 144 may include instructions to coordinate the processing operations of FIG. 4. These operations may be controlled by the ephemeral gallery module 144 or they may be performed in conjunction with selective operations performed by the ephemeral message controller 306.

FIG. 7 illustrates ephemeral gallery module 144 operations performed in accordance with an embodiment of the invention. The first operation of FIG. 7 is to determine whether a new gallery is needed 700. As discussed in connection with FIG. 6, designating "My Story" 602 as a message recipient results in a post of an ephemeral message to an ephemeral gallery. If a gallery does not exist (700—Yes), then a new gallery is created 702. Alternately, if a gallery does exist and a user wants to create a new gallery, then the new gallery is created 702. The user may be supplied a prompt to indicate whether an existing gallery should be used or a new gallery should be designated.

The message is then posted in the gallery with a gallery participation parameter 706. The gallery participation parameter is an ephemeral period of time that the ephemeral message will continue to exist in the gallery. For example, a first ephemeral message posted to the gallery may have a default gallery participation parameter of 24 hours. In other instances, the gallery participation parameter may be set by a user. The gallery participation parameter value decreases with the passage of time. Thus, in this embodiment, an ephemeral message gallery subsists for as long as the gallery participation parameter of the last message posed to the gallery.

In another embodiment, a gallery timer may be assigned to a gallery by a user. The gallery timer may be used to establish a lifespan of an associated gallery and messages posted to this gallery subsist for no longer than the life of the gallery. Thus, in some embodiments, all messages posted to such a gallery will subsist for the duration of the life of the gallery (regardless of posting time). In other embodiments, messages may be submitted with a gallery participation parameter. In these embodiments, messages expire and become inaccessible at the earlier of the gallery participation parameter or the remaining life of the gallery.

The next processing operation of FIG. 7 is to post activity indicia 708. Examples of activity indicia are provided below. A check is then made to determine whether there is an expired participation parameter 710. If so (710—Yes), the ephemeral message associated with the expired participation parameter is removed from the ephemeral gallery 714. If as a result of this removed message the gallery is empty (716—Yes), then the ephemeral gallery ephemeral gallery terminates and indicia of the gallery is removed 718. If the gallery is not empty (716—No), a check is made for a new message 712. If a new message exists (712—Yes), then processing returns to block 706. If a new message does not exist (712—No), then processing returns to block 710. If an expired participation parameter does not exist (710—No), then a check is made once again for a new message 712.

Figure 8:
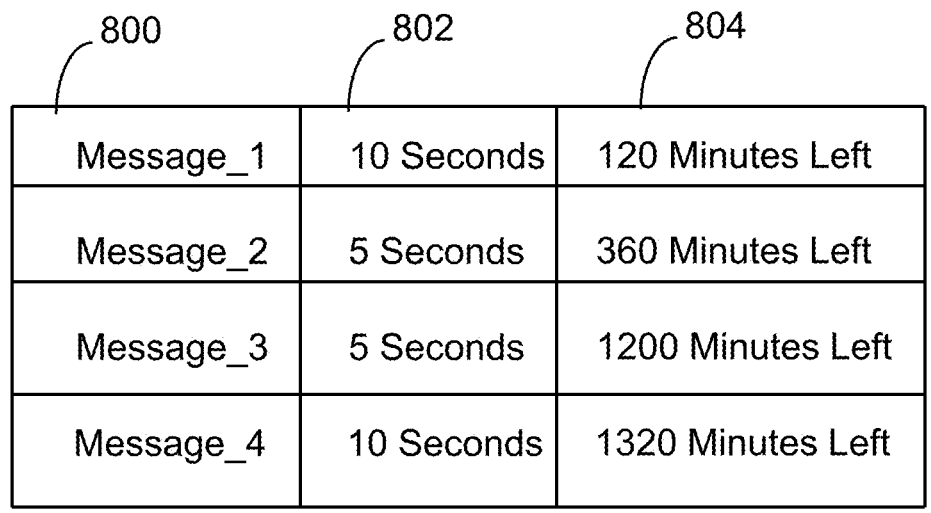
FIG. 8 illustrates an ephemeral gallery data structure associated with an embodiment of the invention.

FIG. 8 illustrates a data structure for an ephemeral message gallery. A first column 800 may have a list of messages. Another column 802 may have a list of message duration parameters for individual messages. Another column 804 may have a list of gallery participation parameters for individual messages. Observe in this example that the values in column 802 add up to 30 seconds. Thus, the ephemeral message gallery in this example has four messages that will take 30 seconds to display. Further observe that the oldest message (Message_1) is displayed first and will be removed in 120 minutes. In this example, the newest message (Message_4) will remain in the ephemeral gallery for 1320 minutes at which point the ephemeral gallery will expire, unless another message is posted. The arrival of a new message alters the gallery timer, but does not alter gallery participation parameters.

Figure 9:
FIG. 9 illustrates ephemeral gallery indicia associated with an embodiment of the invention.

FIG. 9 illustrates an interface 900 with a section 902 that designates available ephemeral message galleries (stories) and a section 904 with a listing of friends (available destinations for an ephemeral message). Observe that section 902 has indicia of ephemeral message gallery activity. FIG. 9 provides example indicia of the time that the last message was posted to the ephemeral message gallery. FIG. 9 also provides example graphical indicia of the amount of time remaining for an ephemeral message gallery. Observe that the first entry was posted 20 minutes ago and therefore has a full circle indicative of the time remaining for that ephemeral message gallery. On the other hand, the third entry was posted 12 hours ago and has approximately half a circle to indicate the time remaining for that ephemeral message gallery. This example contemplates a 24 hour period for an ephemeral message gallery. Naturally, other time periods may be utilized in accordance with embodiments of the invention.

Figure 10:
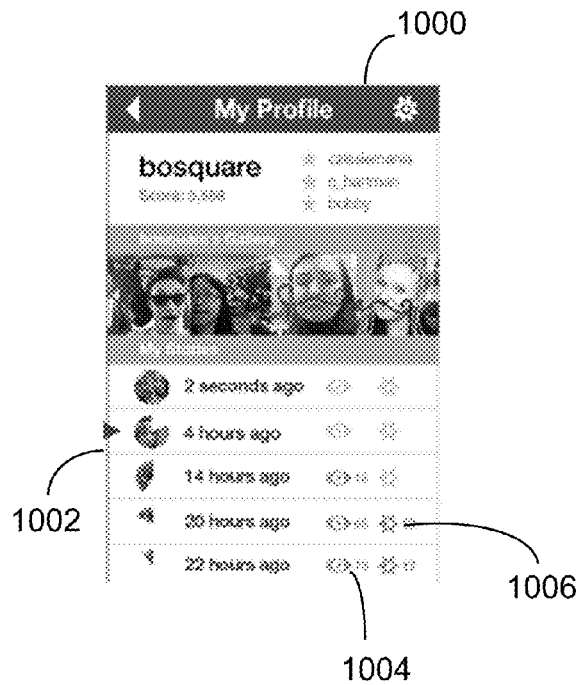
FIG. 10 illustrates ephemeral gallery indicia associated with another embodiment of the invention.

FIG. 10 illustrates an interface 1000 with information on a user's stories. Individual stories 1002 have indicia of the amount of time remaining. Indicium 1004 of the number of ephemeral gallery views is also provided. Indicium 1006 of screenshots taken of an ephemeral message is also provided. This information is significant since the intent of the message was that it be ephemeral. If a message recipient overrides this intent by taking a screen shot, then the message sender is advised.

Figure 11:
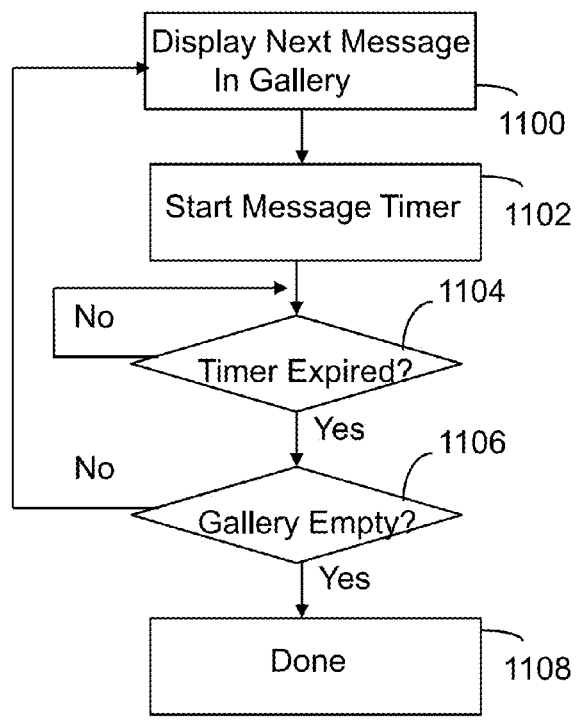
FIG. 11 illustrates operations performed in response to an ephemeral gallery view request.

FIG. 11 illustrates processing operations performed by the ephemeral gallery module 144 in response to a request for an ephemeral message gallery. As shown in FIG. 6, a user receives a list of 602 of available stories. Haptic contact with indicia of a story is operative as a request to view an ephemeral message gallery.

The first operation in FIG. 11 is to display the next message in the gallery 1100. In the example of FIG. 8, the oldest message is the first message to be displayed. A message timer is then started 1102. The message timer expires at the end of the message duration parameter for the displayed ephemeral message. In the example of FIG. 8, the first message (Message_1) is displayed for 10 seconds. Block 1104 checks for the timer to expire. Upon expiration of the timer (1104—Yes), a check is made to determine if the gallery is empty 1106. If so (1106—Yes), processing is completed 1108. If not (1106—No), processing returns to block 1100. This processing loop is repeated until the gallery is empty.

Figure 12:
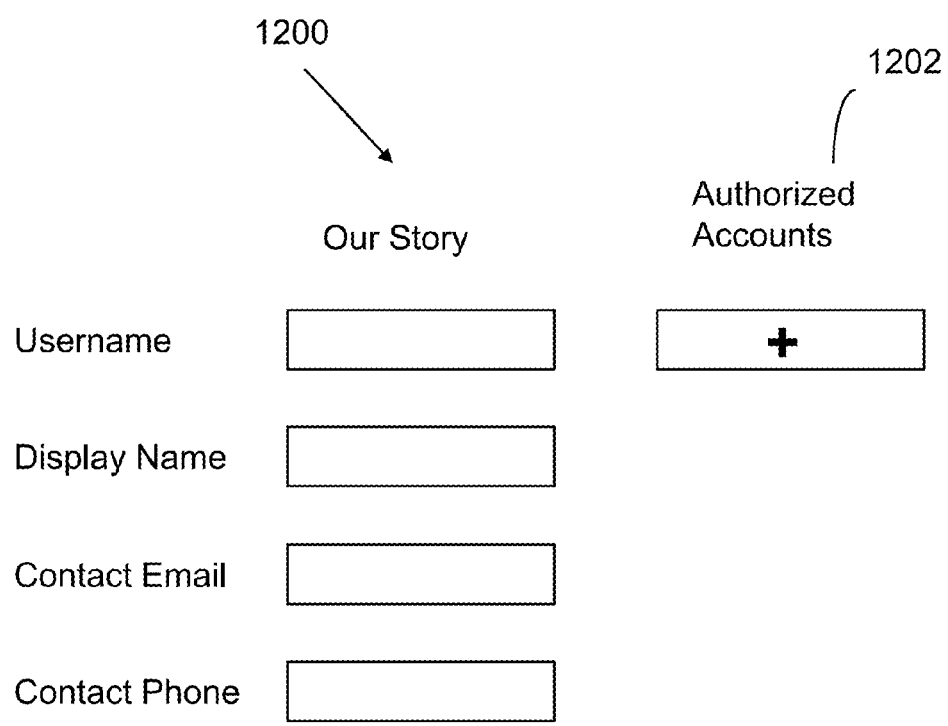
FIG. 12 illustrates an account administration interface to establish an ephemeral gallery that receives ephemeral messages from multiple users.

FIG. 12 illustrates an account administration interface 1200 to establish an ephemeral gallery that receives ephemeral messages from multiple users. Such a feature may be used to facilitate celebrity or organizational accounts where numerous authorized users are allowed to post on behalf of a single account. In one embodiment, a username, display name, contact email and contact phone are specified by an account administrator. An authorized accounts prompt 1202 allows the account administrator to add other users to the ephemeral gallery. For example, activation of the prompt 1202 may result in prompts for a username, display name, contact email and/or contact phone. Alternately, activation of the prompt 1202 may result in an interface of the type shown in FIG. 6 through which authorized accounts may be added. Similar interfaces may be used for specifying privacy settings, such as which accounts are authorized to receive images of an individual.

Although the embodiments described in FIGS. 3-12 depict the use of privacy protection concepts in the context of an ephemeral gallery, it is to be understood that other embodiments contemplate the application of the concepts in these figures to privacy protection in any communication protocols, including, e.g., chat, SMS, IM, other mobile, email, etc.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method executed by a computer, comprising:
receiving an image from a client device;
executing a facial recognition technique against an individual face within the image to obtain a recognized face;
applying privacy rules to the image; and
distributing a privacy protected version of the image, wherein the privacy protected version of the image has an altered image feature, wherein the privacy protected version of the image is distributed to an ephemeral gallery including a collection of ephemeral images shown in sequence, and wherein the ephemeral gallery is available for an ephemeral period of time, wherein each ephemeral image has an associated message duration parameter that indicates a display duration for the corresponding ephemeral image during viewing of the ephemeral gallery, and each ephemeral image has a gallery participation parameter that indicates a time value for continued availability of the corresponding ephemeral image in the ephemeral gallery, wherein a particular one of the plurality ephemeral images is removed from the ephemeral gallery in response to the identification of an expired gallery participation parameter corresponding to the particular ephemeral image, and wherein the ephemeral gallery is eliminated upon expiration of either a gallery timer or upon expiration of the gallery participation parameter of a last ephemeral image in the ephemeral gallery, the last ephemeral image being that one of the plurality of ephemeral images which was posted to the ephemeral gallery last.

2. The method of claim 1 wherein the altered image feature is a blurred image of the recognized face.

3. The method of claim 1 wherein the altered image feature is a block over the recognized face.

4. The method of claim 3 wherein the block is selected from an emoticon, an icon and a brand.

5. The method of claim 1 wherein the altered image feature is a block over the recognized face and the body associated with the recognized face.

6. The method of claim 1 wherein executing includes making network calls to a machine supplying facial recognition services.

7. A method executed by a computer, comprising:
receiving an image from a client device;

executing a facial recognition technique against an individual face within the image to obtain a recognized face;

applying privacy rules to the image; and limiting distribution of the image in accordance with the privacy rules and selectively distributing the image to an ephemeral gallery including a collection of ephemeral images shown in sequence, wherein the ephemeral gallery is available for an ephemeral period of time, wherein each ephemeral image has an associated message duration parameter that indicates a display duration for the corresponding ephemeral image during viewing of the ephemeral gallery, and each ephemeral image has a gallery participation parameter that indicates a time value for continued availability of the corresponding ephemeral image in the ephemeral gallery, wherein a particular one of the plurality ephemeral images is removed from the ephemeral gallery in response to the identification of an expired gallery participation parameter corresponding to the particular ephemeral image, and wherein the ephemeral gallery is eliminated upon expiration of either a gallery timer or upon expiration of the gallery participation parameter of a last ephemeral image in the ephemeral gallery, the last ephemeral image being that one of the plurality of ephemeral images which was posted to the ephemeral gallery last.

8. The method of claim 7 wherein limiting distribution of the image includes blocking the distribution of the image.

9. The method of claim 7 wherein limiting distribution of the image includes limiting distribution of the image to members of the social network associated with the recognized face.

10. The method of claim 7 wherein limiting distribution of the image includes soliciting permission from the user associated with the recognized face prior to distribution of the image.

11. The method of claim 7 further comprising distributing a privacy protected version of the image, wherein the privacy protected version of the image has an altered image feature.

12. The method of claim 11 wherein the altered image feature is a blurred image of the recognized face.

13. The method of claim 11 wherein the altered image feature is a block over the recognized face, wherein the block is selected from an emoticon, an icon and a brand.

14. The method of claim 11 wherein the altered image feature is a block over the recognized face and the body associated with the recognized face.

* * * * *